United States Patent [19]

Smart

[11] 4,381,166

[45] Apr. 26, 1983

[54] FORK UNIT HAVING ADJUSTABLE FORKS

[76] Inventor: Robert L. Smart, 11670 Fields Rd., New Carlisle, Ohio 45344

[21] Appl. No.: 200,961

[22] Filed: Oct. 27, 1980

[51] Int. Cl.$^3$ ............................ B60P 1/50; B66F 9/14

[52] U.S. Cl. .................................... 414/685; 74/89.15; 414/667

[58] Field of Search ............... 414/619, 620, 621, 664, 414/667, 671, 763, 783, 785, 685, 741; 294/67 BB; 74/424.8 R, 424.8 B, 89.15

[56] References Cited

U.S. PATENT DOCUMENTS

| | | | |
|---|---|---|---|
| 1,813,596 | 7/1931 | Abbe | 414/667 |
| 2,339,120 | 1/1944 | Ulinski | 414/667 |
| 2,451,943 | 10/1948 | Gunning | 414/671 |
| 2,462,691 | 2/1949 | Thompson | 294/67 BB |
| 2,483,745 | 10/1949 | Vossenberg | 414/671 |
| 3,424,328 | 1/1969 | Gideonsen et al. | 414/667 X |
| 3,596,968 | 8/1971 | Holm | 414/12 X |
| 4,280,781 | 7/1981 | Bodin | 414/671 |
| 4,335,992 | 6/1982 | Reeves . | |

*Primary Examiner*—Leslie J. Paperner
*Attorney, Agent, or Firm*—Jacox & Meckstroth

[57] ABSTRACT

A lift unit for attachment to a vehicle having hoist members. The lift unit rotatably supports a plurality of elongate threaded rods. A drive motor is operably connected to the elongate threaded rods for rotation thereof. Nut members are threadedly joined to each of the threaded rods. Carrier members enclose the nut members and prevent rotation thereof. The carrier members and the nut members thus move along the threaded rods as the threaded rods are rotated. Fork members are joined to the carrier members for movement therewith. Operation of the drive motor thus moves the forks and changes the spacing therebetween, for positioning the forks below an object or at opposed portions of an object for supporting the object during movement of the lift unit with movement of the hoist members.

3 Claims, 5 Drawing Figures

FORK UNIT HAVING ADJUSTABLE FORKS

BACKGROUND OF THE INVENTION

It is an object of this invention to provide a fork unit for an industrial tractor or other vehicle or the like which has hoist mechanism, in which the fork unit has forks which are adjustable toward and away from each other. Thus, the forks can be positioned to engage an object at the underside thereof or in a grasping position at opposed portions of the object for lifting the object with movement of the fork unit.

It is another object of this invention to provide such a fork unit in which major elements thereof are readily and easily replaceable.

It is another object of this invention to provide such a fork unit in which major elements thereof are readily replaceable and are adapted to wear, before other elements of the unit.

It is another object of this invention to provide such a fork unit in which the forks thereof are easily and readily interchangeable with other types of engagement members, such as hooks, farm combine machine heads, arms, and the like, for operation thereof for lifting an object.

Another object of this invention is to provide such a fork unit which is capable of exerting significantly high magnitudes of forces or very low magnitudes of forces, while remaining accurate in operation.

Other objects and advantages of this invention reside in the construction of parts, the combination thereof, the method of production, and the mode of operation, as will become more apparent from the following description.

DETAILED DESCRIPTION OF THE INVENTION

Figure 1:
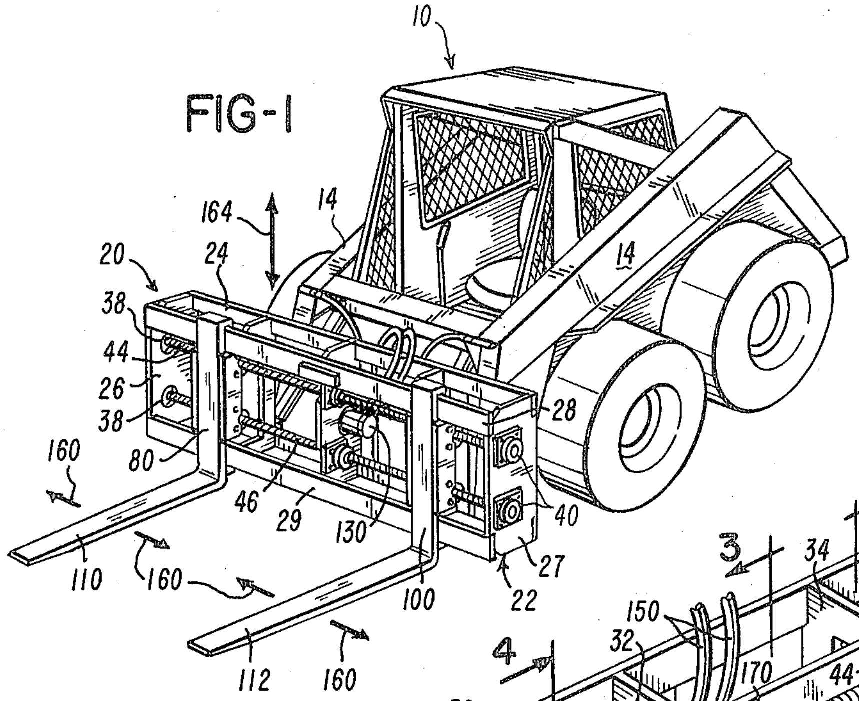
FIG. 1 is a perspective view of a tractor of the lift type which has a fork unit of this invention attached thereto for movement and operation of the fork unit.

FIG. 1 illustrates a tractor 10 provided with support arms 14, the front portions of which are movable upwardly and downwardly, as illustrated. A fork unit 20 of this invention is attachable to the forward portion of the support arms 14 by any suitable means, not shown.

The fork unit 20 comprises a carriage 22 provided with back frame members 24, end frame members 26 and 27, front frame members 28 and 29 and intermediate support members 30, 32, and 34. The support arms 14 are attached to the back frame members 24 of the carriage 22 in any suitable manner, not shown, for lifting and lowering of the carriage 22 by the support arms 14.

Each of the end frame members 26 and 27 is provided with openings 38. A pair of bearing members 40 is attached to each of the end frame members 26 and 27 on the exterior surface thereof and rotatably support the ends of threaded rods 44 and 46 which extend between the end frame members 26 and 27 and through the openings 38. The bearing members 40 are attached to the end frame members 26 and 27 by any suitable means, such as by bolts 48 or the like.

Figure 2:
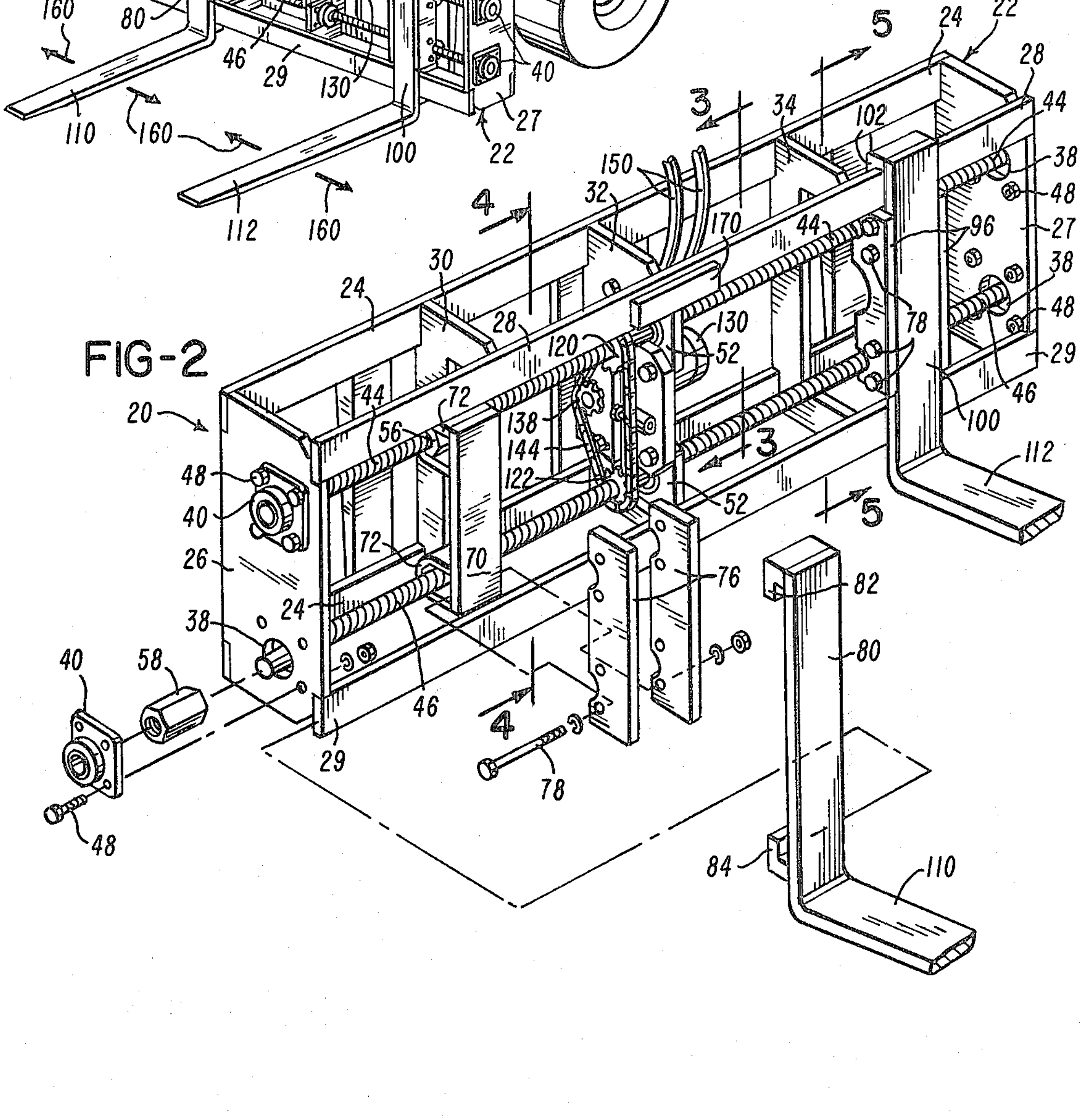
FIG. 2 is an enlarged perspective view, with parts shown exploded, of a fork lift unit of this invention.
Figure 3:
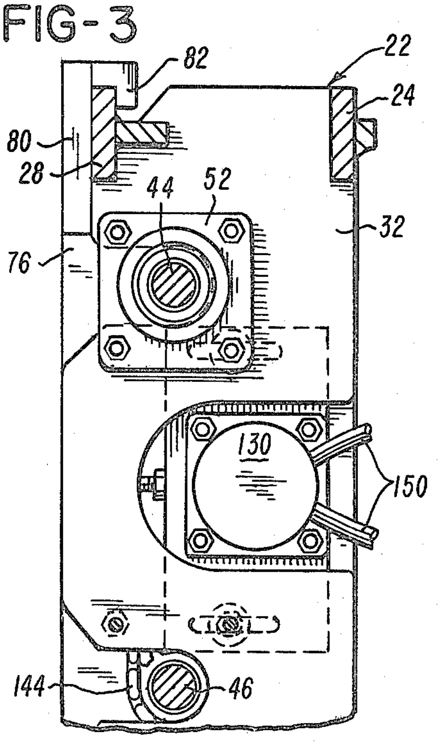
FIG. 3 is a sectional view taken substantially on line 3—3 of FIG. 2.

The threaded rods 44 and 46 are also rotatably supported at the midportion thereof by bearing members 52 which are attached to the intermediate support member 32, as shown in FIGS. 2 and 3. The threaded rods 44 and 46 have threads in a clockwise or right-hand direction between the intermediate support member 32 and the end frame member 27, and the threaded rods 44 and 46 have threads in a counterclockwise or lefthand direction between intermediate support member 32 and the end frame member 26.

Between the end frame member 26 and the intermediate support member 32 the threaded rod 44 threadedly carries an elongate nut 56. Between the end frame member 26 and the intermediate support member 32 the threaded rod 46 threadedly carries an elongate nut 58. Between the end frame member 27 and the intermediate support member 32 the threaded rod 44 threadedly carries an elongate nut 60. Between the end frame member 27 and the intermediate support member 32 the threaded rod 46 threadedly carries an elongate nut 62. As illustrated in FIG. 2, the elongate nut 58 is movable through its respective openings 38 in the end frame member 26 for threaded attachment to the threaded rod 46. Likewise each of the elongate nuts 56, 60, and 62 is movable through its respective openings 38 in its respective end frame member 26 or 27 for threaded attachment to its respective threaded rod 44 or 46.

As shown in FIG. 2, between the end frame member 26 and the intermediate support member 32, a carrier 70 is shown which has loop portions 72 which encompass the elongate nuts 56 and 58. The loop portions 72 retain the elongate nuts 56 and 58 against rotative movement upon their respective threaded rods 44 and 46. Positioned at opposite sides of the carrier 70 and the loop portions 72 thereof are enclosure members 76 which are attached to the loop portions 72 by means of bolts 78. The enclosure members 76 extend forwardly from the carrier 70 at each side thereof and snugly retain therebetween a stem 80. The upper portion of the stem 80 has attached thereto a slide bracket 82 which extends over the upper edge of the front frame member 28 and has a portion at the back surface of the front frame member 28. The lower portion of the stem 80 has attached thereto a slide bracket 84 which extends under the lower edge of the front frame member 29 and has a portion at the back surface of the front frame member 29. The slide brackets 82 and 84 are slidable along their respective front frame members 28 and 29 and retain the stem 80 upon the front frame members 28 and 29.

Figure 5:
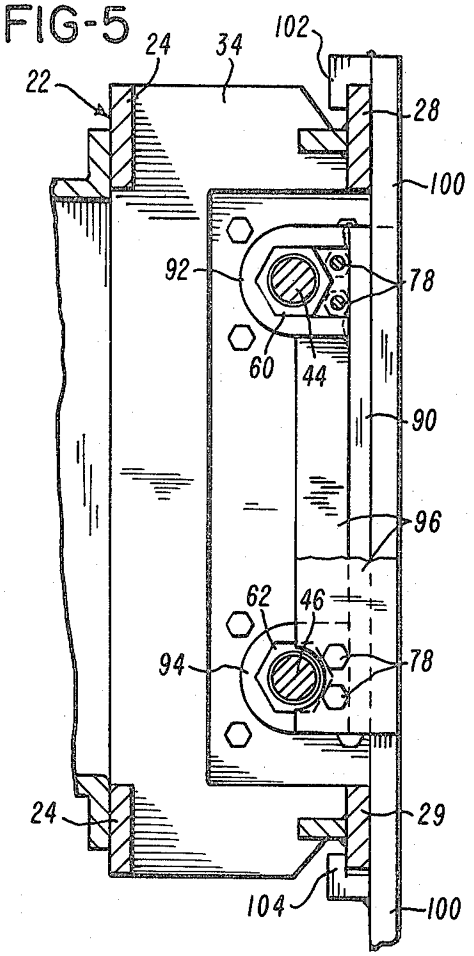
FIG. 5 is a sectional view taken substantially on line 5—5 of FIG. 2.
Figure 4:
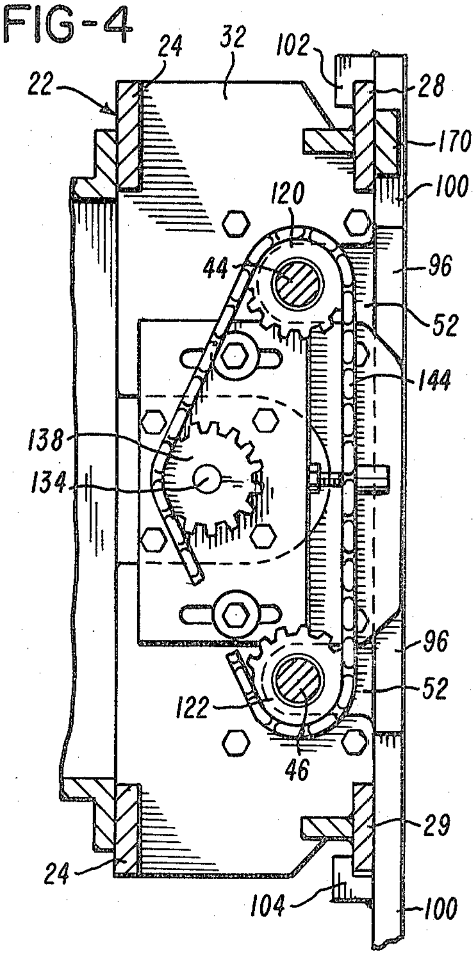
FIG. 4 is a sectional view taken substantially on line 4—4 of FIG. 2.

Likewise a carrier 90, which is positioned between the intermediate support member 32 and the end frame member 27, has loop portions 92 which closely encompass the elongate nuts 60 and 62, as best illustrated in FIG. 5, and retain the elongate nuts 60 and 62 against rotative movement upon their respective threaded rods 44 and 46. At opposite sides of the carrier 90 and the loop portions 92 thereof are enclosure members 96 which are attached to the loop portions 92 by means of bolts 78. The enclosure members 96 extend forwardly from the carrier 90 at each side thereof in a direction from the loop portions 92 and snugly retain therebetween a stem 100. The upper portion of the stem 100 has attached thereto a slide bracket 102 which extends over the upper edge of the front frame member 28 and has a portion at the back surface of the front frame member 28. The lower portion of the stem 100 has attached thereto a slide bracket 104 which extends under the lower edge of the front frame member 29 and has a portion at the back surface of the front frame member 29. The slide brackets 102 and 104 are slidable along their respective front frame members 28 and 29 and retain the stem 100 upon the front frame members 28 and 29.

The stem 80 has an elongate fork 110 extending forwardly and at a right angle therefrom at the lower portion thereof. The stem 100 has an elongate fork 112 extending forwardly and at a right angle therefrom at the lower portion thereof.

Adjacent the intermediate support member 32 is a sprocket wheel 120 which is secured to the threaded rod 44. Adjacent the intermediate support member 32 is a sprocket wheel 122 which is secured to the threaded rod 46.

A drive motor 130 is attached to the intermediate support member 32 on one side thereof and has a drive shaft 134 extending through the intermediate support member 32. Secured to the drive shaft 134 is a drive sprocket wheel 138 which is substantially coplanar with the sprocket wheels 120 and 122. Encompassing and in meshed engagement with the sprocket wheels 120, 122, and 138 is a drive chain 144. The drive motor 130 is shown as being a fluid motor in the form of a hydraulic motor and has fluid lines 150 joined thereto for supplying fluid thereto from a source thereof, not shown, and from a fluid pump, not shown, which is operated by the engine of the tractor 10.

Thus, operation of the drive motor 130 rotates the drive sprocket wheel 138. Rotation of the drive sprocket wheel 138 causes rotative movement of the drive chain 144, which causes rotation of the sprocket wheels 120 and 122. Rotation of the sprocket wheels 120 and 122 causes rotation of the threaded rods 44 and 46. Rotation of the threaded rods 44 and 46 causes the elongate nuts 56, 58, 60, and 62 to move axially upon their respective threaded rods 44 and 46. Axial movement of the elongate nuts 56, 58, 60, and 62 causes lateral movement of the carriers 70 and 90, causing lateral movement of the stems 80 and 100 and the elongate forks 110 and 112. The elongate forks 110 and 112 move toward or away from each other with rotation of the threaded rods 44 and 46. Therefore, when it is desired to move the elongate forks 110 and 112 one toward the other, the drive motor 130 is caused to rotate in a given direction, and when it is desired to move the elongate forks 110 and 112 one away from the other, the drive motor 130 is caused to rotate in the opposite direction.

It is thus understood that the elongate forks 110 and 112 are movable toward or away from each other as illustrated by arrows 160 in FIG. 1 at any elevational position of the fork unit 20, as the carriage 22 is moved to various elevational positions by the support arms 14, as illustrated by a double arrow 164 in FIG. 1. A block 170 attached to the front frame member 28 limits movement of the stems 80 and 100 one toward the other. Thus, the elongate forks 110 and 112 can be employed to lift objects which are of various dimensions and shapes. The elongate forks 110 and 112 may be positioned under an object, or an object can be grasped between the elongate forks 110 and 112 for lifting thereof.

It is also to be understood that the elongate forks 110 and 112 can be readily replaced by other types of engagement members such as hooks, farm combine machine heads, and the like, as such members are joined to stems, such as the stems 80 and 100.

Due to the fact that lateral movement of the elongate forks 110 and 112 is controlled, operated, and guided by a plurality of spaced-apart parallel threaded rods, and due to the fact that movement of the stems 80 and 100 is guided by the slide brackets 82, 84, 102, and 104, the forks 110 and 112 are capable of exerting high magnitudes of forces or low magnitudes of forces while remaining accurate in operation.

The nuts 56, 58, 60, and 62 which are easily and readily replaceable as shown in the drawings and as discussed above, are preferably of a material which wears more readily than the threaded rods 44 and 46 upon which they are mounted.

Although the preferred embodiment of the fork unit of this invention has been described, it will be understood that within the purview of this invention various changes may be made in the form, details, proportion and arrangement of parts, the combination thereof, and the mode of operation, which generally stated consist in a structure within the scope of the appended claims.

The invention having thus been described, the following is claimed:

1. A lift unit for support by a tractor or the like provided with movable support arms, comprising an elongate carriage attachable to the arms for movement thereby, the carriage being adapted to be positioned at the front portion of the tractor and extending substantially the width of the tractor, the carriage being provided with back support members, a pair of spaced-apart end frame members, front frame members, and an intermediate frame member, the intermediate frame member being attached to the back frame members between the front and back frame members and between the pair of spaced-apart end frame members, a pair of elongate threaded parallel rods rotatably supported by the end frame members and extending therebetween, a pair of sprocket wheels, there being a sprocket wheel secured to each of the threaded rods adjacent the intermediate frame member, a rotary motor supported by the intermediate frame member, a drive shaft extending from the rotary motor, a drive sprocket wheel attached to the drive shaft for rotation therewith, a chain encompassing the drive sprocket wheel and the spocket wheels which are secured to the threaded rods and in meshed relationship therewith, a plurality of nuts, there being two nuts threadedly attached to each of the threaded rods, with a nut being between the intermediate frame member and each of the end frame members, so that a pair of nuts is positioned between each end frame member and the intermediate frame member, a pair of carriers, there being a carrier supported by each pair of nuts and retaining the nuts against rotation, so that rotative movement of the threaded rods causes axial movement of the nuts and the carriers along the threaded rods, a pair of forks, means joining each fork to one of the carriers for movement therewith, operation of the rotary motor thus moving the forks with respect to the carriage for lifting an object with movement of the carriage by positioning the forks under the object or on opposite portions of the object.

2. The lift unit of claim 1 which includes means for slidable attachment of the forks to the carriage for movement of the forks with respect to the carriage.

3. The lift unit of claim 1 in which each carrier includes a pair of loop portions, there being a loop portion closely encompassing each nut and retaining the nut against rotation, a pair of enclosure members carried by each carrier adjacent the nuts and enclosing the nuts, a pair of stems, there being a stem snugly positioned between each pair of enclosure members, each stem having bracket portions which engage spaced-apart portions of the carriage for guiding movement of the carrier along the carriage and for guiding movement of the forks along the carriage.

* * * * *